3,260,554
TRACTOR TRAILER BRAKE
Robert J. Heiland, South Bend, Ind., assignor to The Bendix Corporation, South Bend, Ind., a corporation of Delaware
Filed Sept. 24, 1962, Ser. No. 225,443
3 Claims. (Cl. 303—18)

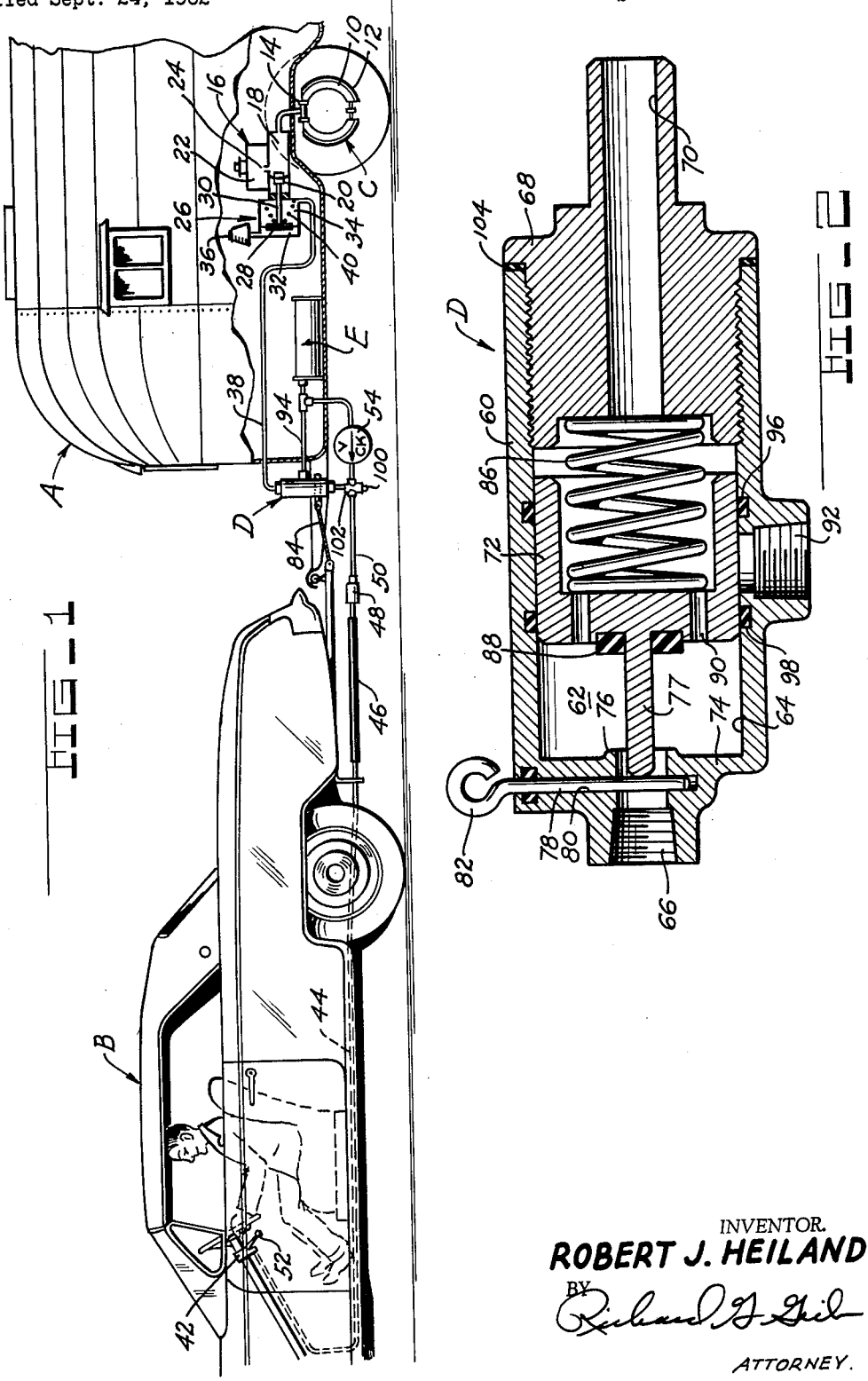

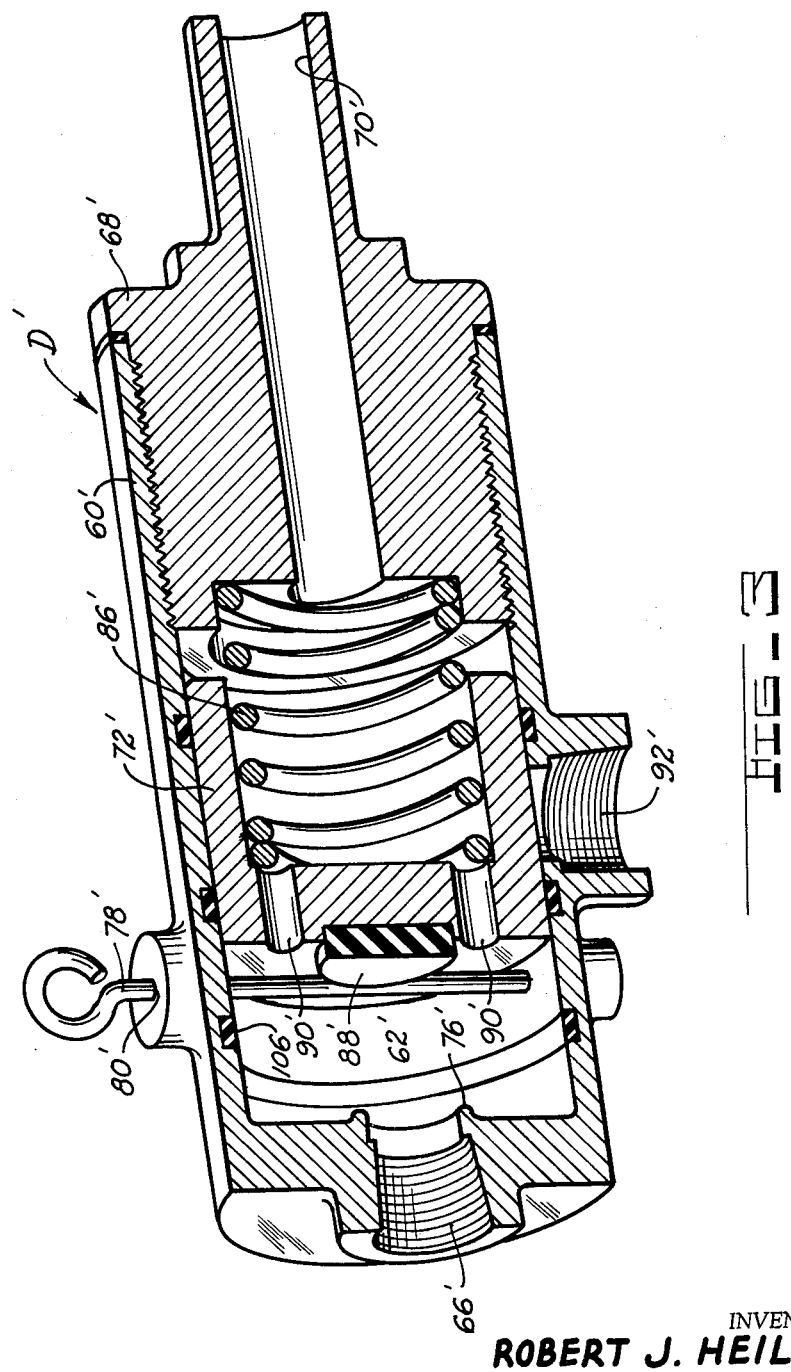

The present invention relates to vacuum actuated braking systems for land vehicles adapted to pull trailers. More particularly, this invention relates to a "break-away valve," which is simple in design and construction.

The principal object of the present invention is the provision of a new and improved system of vacuum actuated atmospheric suspended brake actuating means for trailer-type vehicles.

It is also a principal object of this invention to provide a simple construction of a "break-away" protection valve for a trailer vehicle which will actuate the braking system of the trailer should it become separated from the main or tractor vehicle.

Further objects and advantages of the above-mentioned brake system and "break-away" valve will become apparent to those skilled in the art to which it relates from the following description of the preferred embodiment described with reference to the accompanying drawings forming a part of this specification in which:

FIGURE 1 shows a tractor-trailer type vehicle comprising: a passenger car that is towing a conventional house trailer and in which a vacuum actuated atmospheric suspended braking system is provided for operating brakes on the trailer portion of the vehicle;

FIGURE 2 is a cross sectional view through the "break-away valve" shown in FIGURE 1; and FIGURE 3 is a cross sectional view of another embodiment of the "break-away" valve which incorporates the principles of the present invention.

In more detail and with reference to FIGURE 1, a conventional house trailer A is shown connected to an automobile B. The house trailer is shown to be provided with a braking system, which comprises a conventional brake structure C mounted in the trailer. The brake structure C is to be controlled by a mechanism later to be described by suitable valving structure in the automobile B.

With regard to the brake structure C, it is shown as including a conventional drum type brake having brake shoes 10, a revolving drum 12, and a hydraulic wheel cylinder 14 for moving the shoes into engagement with the drum. The wheel cylinder is actuated by a master cylinder 16, having a fluid pressure chamber 18 from which fluid is displaced to the wheel cylinder, as by a piston 20. In order to provide for fluid expansion, contraction and even for a limited amount of leakage, a fluid compensating reservoir 22 is communicated to the fluid displacement chamber 18 in the normal retracted position of the hydraulic piston 20, which communication is by means of a compensating port 24 that is automatically closed off by a seal on the piston 20, when the piston is caused to displace fluid from the chamber 18.

In order to actuate the master cylinder, I have shown an atmospheric suspended motor 26 having a power piston 28 therein, which is directly connected to the hydraulic piston 20 by means of the push rod 30. The power piston separates the internal chamber of the atmospheric suspended motor into opposing fluid pressure chambers 32 and 34. The chambers are, respectively, connected to atmosphere through air filter 36 and vacuum through the control line 38. The power piston 28 is normally held in the brake releasing condition shown in the drawing by means of a power piston return spring 40. When a vacuum is drawn in control line 38, the piston 28 moves to decrease the volume of chamber 34 to thereby cause the piston 20 to displace fluid to actuate the wheel cylinder and thereby apply the brakes of the trailer A.

In order that the trailer brakes may be under the control of the driver of the automobile B, suitable valve structure is provided for supplying a vacuum to the trailer's control line 38 when it is desired to actuate the trailer brakes. It is to be understood that vacuum may be obtained from any suitable source, as for example the manifold of the engine for the automobile B, and suitable valve structure may be used to regulate its communication to the trailer's control line 38. In addition, where the brakes of the automobile or tractor, as the case may be, are powered, as by a vacuum means, the control valve of the vacuum means may also be connected to the control line 38 so that it will simultaneously actuate the brakes of the trailer along with the brakes of the automobile B, and one such system connecting the tractor's power brake control to a trailer brake system is shown in the copending U.S. application No. 158,244, now Patent No. 3,117,822, assigned to the common assignee.

However, I have shown that a separate control valve may be provided on the automobile in the form of a hand control valve 42. The hand control valve normally communicates atmospheric pressure to its discharge line 44 that includes a flexible portion 46 and a disconnect coupling 48 to an interconnecting line 50. When it is desired to actuate the trailer's brakes, a hand lever 52 of the control valve 42 is moved to cause the control valve 42 to communicate vacuum through the discharge line 44 to the interconnecting line 50 and, thus, to a break-away valve D. As long as the tractor and trailer are connected, the valve D allows the drawing of a vacuum in the line 38 and thus applies the trailer's brakes. If the hand lever 52 is moved back to its normal "off" position, atmospheric pressure is communicated, as above-mentioned, to remove the differential pressure across the power piston 28 and allow the return spring 40, along with the pressure in chamber 18 to return the brake actuating structure to its original position to release the trailer's brakes.

In addition, the trailer is provided with a vacuum reservoir E which is communicated to the trailer interconnecting line 50 through a check valve 54. The check valve is so arranged that whenever the control valve on the automobile is actuated (in this instance, the hand control valve 42) vacuum will be communicated through the check valve 54 to evacuate the vacuum reservoir. It is, therefore, recommended that the operator of the automobile actuate the hand lever 52 before starting forward motion of the automobile and trailer, as shown, so that the vacuum reservoir E will be in its energized condition before movement of the vehicle occurs. In any event, the reservoir E will be energized with vacuum the first time that the brakes of the trailer are actuated; but this, of course, will cause some delay between the time that the control valve 42 is actuated and the time that the brake structure C is actuated.

With reference to the break-away valve D, as seen in FIGURE 2, it is shown to include a valve housing 60 having an axially extending cylindrical chamber 62 therein with side walls 64. An inlet port 66 is located in the closed end of the housing and the opposite end of the housing is closed off by means of a threaded member 68 which has an outlet port 70 extending therethrough. A piston 72 is positioned in the chamber 62 between a fixed end wall 74 and the enclosure member 68. The piston is adapted to slide from the position shown in FIGURE 2 adjacent to the enclosure member 68 to a second position adjacent the fixed end wall 74 wherein it abuts a valve seat 76 that surrounds the inlet port to close off fluid flow through the inlet port 66. The piston is normally held in its first recited position by means of a projection 77 which extends into the inlet port 66 and is engaged by an abutment pin 78 that extends laterally through an opening 80 in the housing 60. The outer end of the pin 78 is provided with a hook 82, by means of which it is connected to the automobile, as by a flexible chain 84 seen in FIGURE 1. In order to bias the piston against the pin, a coil spring 86 is positioned between the piston and the enclosure member 68 so that if the pin is removed, the piston will have its rubber facing 88 engaging the valve seat 76. However, when the pin 78 is in place, there is flow communication through the valve D through the inlet port 66 and flow passages 90 that extend through the piston 72 outwardly of the rubber facing 88.

The housing of the valve D is further provided with a reservoir port 92 that extends into the chamber 62 through the sides thereof such that it will be covered by the piston 72, as seen in FIGURE 2. The reservoir port is always in full communication with vacuum reservoir E through the continually open line 94. Therefore, when the pin 78 is pulled, the reservoir port 92 is communicated directly to the outlet port 70 to actuate the trailer brakes C, while at the same time the inlet port 68 is completely valved off so that the vacuum of the reservoir E will not be destroyed by air entering through a broken connection in the trailer line 50 or interconnecting line 46, as the case may be. If it is deemed necessary by those employing my system, a pair of O rings 96 and 98 may be positioned in grooves in the side walls of the chamber 62 on opposite sides of the reservoir port 92 to prevent leakage through the port when the piston is in the position shown by FIGURE 2.

In operation, i.e., when separation of the trailer and the tractor pulling it has occurred the chain 84 will withdraw the pin 78 out of the opening 80 to allow piston 72 to move to close off the port 66. When the piston is in this position, the reservoir port 92 is completely open so that vacuum from the reservoir E is communicated to the rear opposing chamber 34 of the atmospheric suspended motor 26 to actuate the hydraulic piston 20 and, in turn, apply the brake structure C of the trailer A.

Once the pin 78 has been pulled, it is necessary to disconnect the line 38 from the break-away valve D to allow air to enter the motor 26 and release the trailer's brakes C. In addition, the enclosure member 68 is provided with a long thread engagement with the housing 60 so that the enclosure member can be screwed out to a position substantially removing all the compression from the spring 86. Thus, in order to reactivate the break-away valve D line 38 is disconnected, member 68 is unscrewed and the piston 72 is moved its rearward position, as by means of removing a plug 100 in the bottom of the T on the cross-connection 102 (see FIGURE 1) allowing a suitable implement to be inserted through the inlet port 66 and force the projection 76 past the pin receiving opening 80. Thereafter the pin 82 can be inserted, the implement withdrawn, and the plug 100 replaced. After the reinsertion of the pin 82, the enclosure member is tightened into position against the gasket 104 to compress the spring 86 and thereby recock the valve. Thereafter, the braking system is returned to normal by reconnecting the line 38 with the outlet port 70.

As for the modified embodiment shown by FIGURE 3 of the break-away valve D', this valve differs from the preferred embodiment in the location of the pin 78'. Thus, the embodiment shown in FIGURE 3 has the pin 78' extending laterally through the chamber 62 to one side of the rubber facing 88 instead of through the inlet port 66'. Therefore, as the pin 78' is adapted to be engaged directly by the main body of the piston 72', the piston does not require the projection 77 of FIGURE 2. However, with such an embodiment as shown in FIGURE 3, an additional sealing means 106 may be provided to prevent depletion of the vacuum in the reservoir E through the opening 80' when the piston 72' is urged by the spring 86' to engage the valve seat 76'. It is to be understood that the additional sealing means, if desired, will be of the same general type as the sealing means aforementioned.

It will be seen that the objects heretofore enumerated, as well as others, have been accomplished and that there has been provided a simple and inexpensive braking system for a tractor trailer combination type vehicle that not only provides satisfactory normal operation, but will at the same time provide automatic break-away protection for the trailer portion of the vehicle combination.

While the invention has been described in considerable detail, I do not wish to be limited to the particular embodiments as shown and described and it is my intention to cover all novel adaptations, modifications and arrangements thereof which come within the practice of those skilled in the art to which the invention relates.

I claim:

1. A power braking system for a tractor trailer vehicle arrangement having means to activate a trailer brake system that are associated with a tractor brake system and further including the improvement of means to connect said tractor and said trailer brake system comprising:

a break-away valve having an inlet port communicating with the tractor brake system, an outlet port communicating with the trailer brake system and a reservoir port with a movable means controlling which of the remaining ports is in communication with said outlet port, said break-away valve including, a housing for said inlet port, said outlet port, and said reservoir port, a valve seat formed with said housing about said inlet port, seal means about said reservoir port, and a piston reciprocably mounted in said housing, said piston having a resilient means arranged to cooperate with said valve seat and a side wall which cooperates with said seal means about said reservoir port to permit flow from either said inlet port or said reservoir port to said outlet port;

a fluid reservoir adapted to only receive a fluid communicated thereto from said tractor brake system and to direct said fluid to said reservoir port;

means to hold said piston in the position whereby said inlet port is communicated to said outlet port and said reservoir port is closed by said piston to overlie said reservoir port; and means connected with said tractor to remove said means holding said piston to open said reservoir port to said outlet port when said tractor becomes separated from said trailer.

2. A power braking system according to claim 1 and further comprising a means to bias said movable means to close said inlet port when said means restricting movement of said movable means has been removed to open said reservoir port.

3. A power braking system for tractor trailer vehicle portions which are united as a combined vehicle, said system comprising:

a source of power on the tractor portion of the vehicle;

a brake actuating motor on the trailer portion of the vehicle, said motor actuating the trailer's brakes when the source of power is communicated to said motor;

a control valve on the tractor portion of the vehicle for communicating said power to said trailer portion when said control valve is actuated;

a reservoir in flow communication with said source of power on said tractor, which reservoir is mounted on said trailer portion of said vehicle;

a break-away valve mounted on said trailer portion of said vehicle, said break-away valve having an inlet port communicating with said control valve, an outlet port communicating with said motor, and a reservoir port communicating with said reservoir;

a check valve allowing communication of said power source with said reservoir when said control valve is actuated, which check valve prevents reverse flow from said reservoir;

a piston within said break-away valve for alternately connecting said inlet port to said outlet port or said reservoir port to said outlet port; and valve locking means which holds said piston to close said reservoir port position when said tractor and trailer portions form said united vehicle and which locking means allows said piston to open said reservoir port and close said inlet port upon separation of said portions of said vehicle.

References Cited by the Examiner
UNITED STATES PATENTS

| | | | |
|---|---|---|---|
| 2,184,363 | 11/1957 | Phillips | 303—18 X |
| 2,871,064 | 1/1959 | Price | 303—31 |
| 2,924,423 | 2/1960 | Weiser et al. | 303—18 X |
| 3,088,481 | 5/1963 | Brueckner et al. | 137—625.26 X |

EUGENE G. BOTZ, *Primary Examiner.*